(12) United States Patent
Brown (10) Patent No.: US 9,583,022 B2
(45) Date of Patent: Feb. 28, 2017

(54) APPARATUS FOR TEACHING PERSONAL LIFE SKILLS

(71) Applicant: Joshua Brown, Trevose, PA (US)

(72) Inventor: Joshua Brown, Trevose, PA (US)

( * ) Notice: Subject to any disclaimer, the term of this patent is extended or adjusted under 35 U.S.C. 154(b) by 150 days.

(21) Appl. No.: 14/338,963

(22) Filed: Jul. 23, 2014

(65) Prior Publication Data

US 2016/0027326 A1 Jan. 28, 2016

(51) Int. Cl.
*G09B 19/00* (2006.01)

(52) U.S. Cl.
CPC .............................. *G09B 19/0076* (2013.01)

(58) Field of Classification Search
USPC .......... 434/247, 258, 259, 260, 395; 446/75, 446/227, 476, 478, 487, 488; 220/6, 7; 273/440
See application file for complete search history.

(56) References Cited

U.S. PATENT DOCUMENTS

| | | | |
|---|---|---|---|
| 1,962,687 A | 6/1934 | Hodge | |
| 2,501,902 A * | 3/1950 | Howell | A63F 9/001 283/63.1 |
| 2,972,820 A * | 2/1961 | Cano | G09B 25/00 434/260 |
| 3,566,481 A * | 3/1971 | Causer | G09B 25/00 434/260 |
| D221,658 S * | 8/1971 | Gallagher | 434/260 |
| 3,789,522 A * | 2/1974 | Moore | A63F 9/088 434/433 |
| 4,096,647 A * | 6/1978 | Barry | G09B 19/0076 434/260 |
| 4,457,722 A * | 7/1984 | Housand | A63F 9/00 434/260 |
| 4,661,072 A * | 4/1987 | White | A63H 33/00 434/260 |
| 5,069,623 A * | 12/1991 | Peat | G09B 1/06 434/260 |
| 5,301,478 A * | 4/1994 | Maese, Jr. | A63H 33/008 446/478 |
| 5,435,728 A * | 7/1995 | Fula | G09B 19/00 312/213 |
| 5,542,870 A * | 8/1996 | Westersund | A63H 33/42 220/324 |
| 5,626,477 A | 5/1997 | Adkison | |
| D391,999 S * | 3/1998 | Chininis | D21/475 |

(Continued)

*Primary Examiner* — Kurt Fernstrom
(74) *Attorney, Agent, or Firm* — Ryder, Lu, Mazzeo & Konieczny LLC; Joseph M. Konieczny, Sr.; Gregory J. Gore (57) ABSTRACT

An apparatus for teaching fine motor skills to a special needs student. The apparatus has a plurality of different personal life-skills training tools that more accurately replicate the skill encountered in real life. When the apparatus is arranged in its primary orientation and rests against the student's body, the life-skills training tools replicate the orientation of the objects relative to the orientation encountered by the student in real life. The apparatus includes a configurable platform having a plurality of walls. A plurality of hinges pivotally connect each wall with at least one other wall. The walls of the platform can be oriented and arranged in at least a first configuration forming a housing enclosing the training tools, and a second configuration wherein all of the walls are coplanar. The walls can also be oriented and arranged in at least a third configuration wherein none of the walls are coplanar.

19 Claims, 5 Drawing Sheets

(56) References Cited

U.S. PATENT DOCUMENTS

| | | | | |
|---|---|---|---|---|
| 5,755,576 | A * | 5/1998 | Dunn | A61B 5/162 |
| | | | | 273/454 |
| 6,129,550 | A | 10/2000 | Culberson et al. | |
| 6,142,786 | A * | 11/2000 | Culberson | G09B 1/06 |
| | | | | 273/440 |
| 6,146,238 | A * | 11/2000 | Daiber | A63H 33/00 |
| | | | | 446/476 |
| 6,151,012 | A | 11/2000 | Bullister | |
| 6,443,794 | B2 * | 9/2002 | Oren | A63H 33/00 |
| | | | | 446/227 |
| 6,626,675 | B1 * | 9/2003 | Webber | G09B 1/02 |
| | | | | 434/156 |
| 7,389,232 | B1 | 6/2008 | Bedford et al. | |
| 7,597,209 | B2 * | 10/2009 | Rothschild | A45C 7/0036 |
| | | | | 220/23.87 |
| 8,167,157 | B2 * | 5/2012 | Shalomoff | B65D 11/1833 |
| | | | | 220/4.08 |
| 8,936,502 | B2 * | 1/2015 | King | A63H 33/00 |
| | | | | 446/227 |
| 2004/0096808 | A1 | 5/2004 | Price et al. | |

* cited by examiner

APPARATUS FOR TEACHING PERSONAL LIFE SKILLS

FIELD OF THE INVENTION

The present invention relates to an apparatus for teaching fine motor skills to a special needs student. More particularly, the invention relates to an apparatus with a plurality of different personal life-skills training tools that more accurately replicate the skill encountered in real life.

BACKGROUND OF THE INVENTION

Special education is the practice of educating students with "special needs" in a way that addresses their individual differences and needs. The term "special needs" is used to collectively define those individuals that require assistance due to physical, mental, behavioral, or medical disabilities or delays. Special education typically involves an individualized education plan (IEP), specially adapted equipment and materials, and other interventions.

Over the past few decades, methodologies for identifying and techniques for teaching special needs children have improved greatly. As the demand for special needs education has increased, educators have continued to develop specialized teaching aids and training tools to enhance the effectiveness of and/or reduce the cost of a student's IEP. Many specialized teaching aids are costly and/or complex enough to require training or supervision by a special educational professional. Therefore, it would be desirable to provide a specialized teaching aid that can be manufactured and sold very inexpensively, and used by a student without training or supervision by a special education professional.

Apart from traditional subjects such as English, mathematics and history, many special needs students require assistance learning fine motor skills or life skills. For life skills, the skill level of special needs students can vary greatly. Many special education teaching aids have fixed training tools that are inappropriate for a particular skill level. Therefore, it would be desirable to provide a specialized teaching aid having life-skills training tools that can be adjusted to meet the needs of a wide variety of students.

In the prior art, some special education teaching aids have personal life-skills training tools affixed to various platforms, which are designed to be mounted on either a table top or wall. The student interacts with the training tools from a distal spatial relationship and a third-party perspective compared to real life. In other words, when using the training tool, the student is trained to groom a third person instead of himself. For example, prior art teaching aids may have a tool that simulates tying shoelaces; however, in the prior art, the tool is oriented so that the student learns from the perspective of tying a third party's shoes. For the student to use this skill in real life to tie his/her own shoes, the student must juxtapose what he/she has learned using the training tool. Therefore, it would be desirable to provide a specialized teaching aid that does not require the student to juxtapose the skill acquired from using the teaching aid when the student applies the skill in real life.

SUMMARY OF THE INVENTION

The present invention provides an apparatus for teaching personal, life skills to a special needs student. The apparatus generally comprises a configurable platform and a plurality of life-skills training tools fixed thereto. The configurable platform comprises a plurality of walls having an interior surface and an exterior surface. A plurality of hinges pivotally connecting each wall with at least one other wall. At least one life-skills training tool is fixed to the interior surface of at least one wall. The walls of the platform can be oriented and arranged in at least a first configuration forming a housing enclosing the educational tool, and a second configuration wherein all of the walls are coplanar. The walls can also be oriented and arranged in at least a third configuration wherein none of the walls are coplanar. In one embodiment, the platform comprises six equally-sized walls that form an enclosed cube in the first configuration.

The apparatus includes means for locking the walls in the first configuration. Preferably, the locking means comprises a life-skills training tool fixed to the exterior surface of at least one of the platform walls. In one embodiment, the locking means comprises a clothing belt.

Preferably, the personal life-skills training tools replicate the skill of manipulating a clothing fastener. For example, the training tools may replicate manipulation of a zipper, belt, shoelace, buttons, snap fasteners, hooks, or Velcro tabs. In other embodiments, the training tools replicate other manipulative skills such as sewing, cooking, carpentry, etc.

In a preferred embodiment, the apparatus has a primary orientation for use. When the apparatus is arranged in the primary orientation and rests against the student's body, the life-skills training tool is first-person oriented. In other words, the tools replicate the orientation of the objects relative to the orientation encountered by the student in real life. This aspect of the invention ensures that the student need not make any mental juxtaposition of a skill from the classroom to the real world.

In preferred embodiments, the training tools are removably fastened to the walls of the platform. A plurality of interchangeable life-skills training tools are provided so that the apparatus can be customized to students of all ages and ability. In another embodiment, the training tools are permanently fixed to the platform walls. However, in this embodiment, the walls are removably and pivotally connected to one another. The apparatus includes a plurality of replacement walls having a different life skills training tool attached thereto.

In preferred embodiments, the platform itself functions as a training tool. For example, in one embodiment, the walls must be folded in a defined sequence in order to form the housing. The student must also arrange the apparatus in the primary orientation in order to use the training tools optimally.

DESCRIPTION OF PREFERRED EMBODIMENTS

For the purpose of illustrating the invention, several embodiments of the invention are shown in the accompanying drawings. However, it should be understood by those of ordinary skill in the art that the invention is not limited to the precise arrangements and instrumentalities shown therein and described below. Throughout the specification, like reference numerals are used to designate like elements. As used in connection with various elements and portions of elements, the terms "distal" and "proximal" refer to their spatial relationship relative to the user of the claimed apparatus. As used herein, the term "personal skill" refers to a motor skill performed on one's body, such as brushing one's teeth, or an object worn on one's body, such as buttoning one's shirt. As used herein, the term "first-person perspective" refers to the orientation of an object encountered during personal use of that object. As used herein, the term "primary orientation" refers to the orientation of the apparatus relative to the user wherein the educational effects of the training tools are optimized, i.e., oriented in the first-person perspective.

Figure 3:
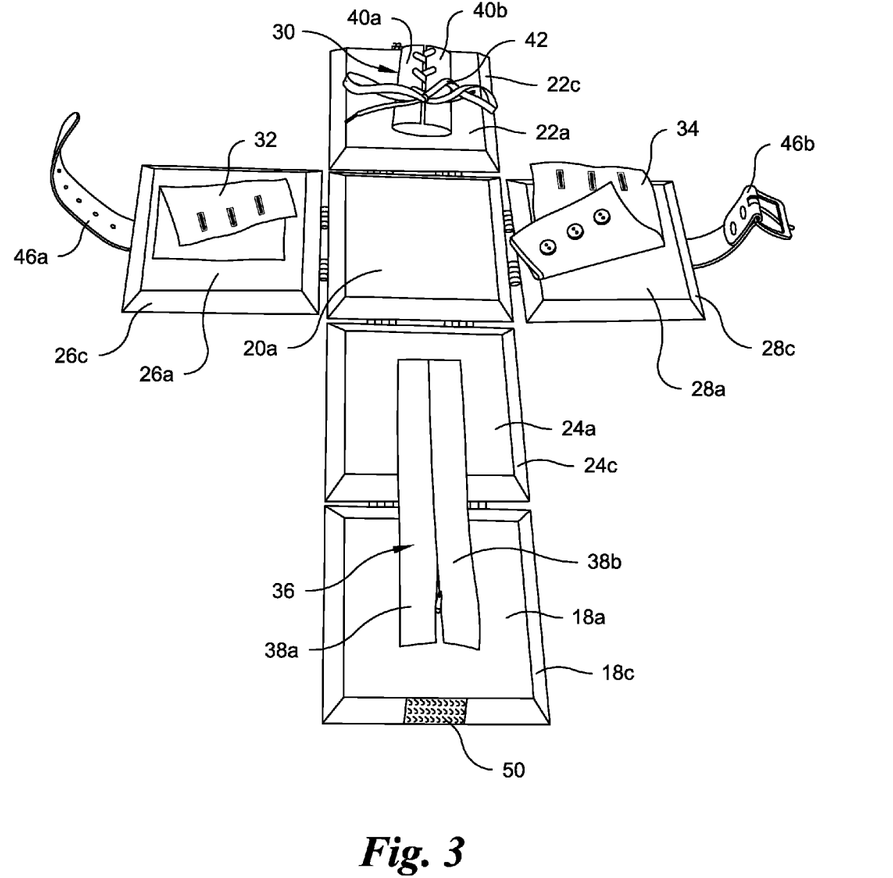
FIG. 3 is a perspective view of the apparatus of claim 1 wherein the platform has been reconfigured to a fully-open configuration.
Figure 4:
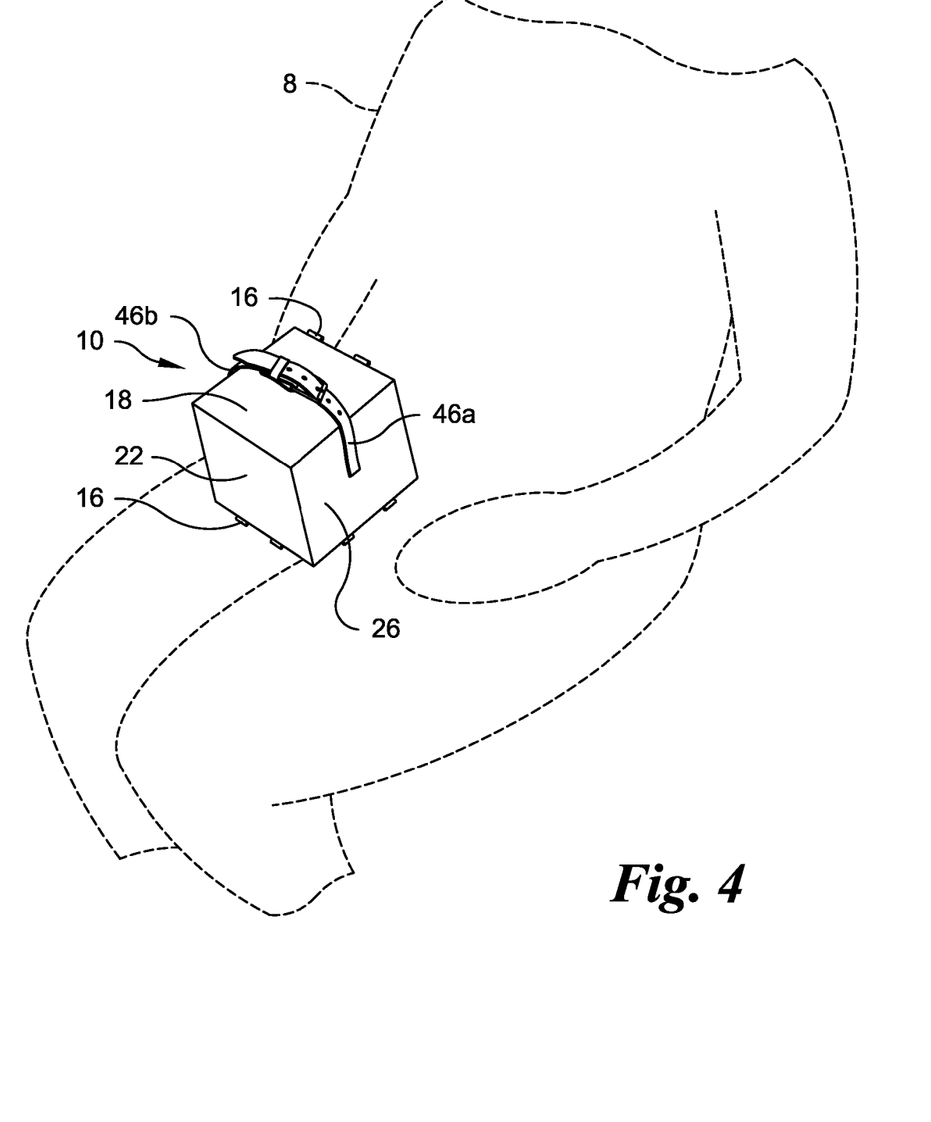
FIG. 4 is a perspective view of the apparatus of claim 1 resting in the lap of a student in a closed configuration; and, FIG. 5 is a perspective view of the apparatus of claim 1 resting on the torso of a student in an open configuration.
Figure 5:
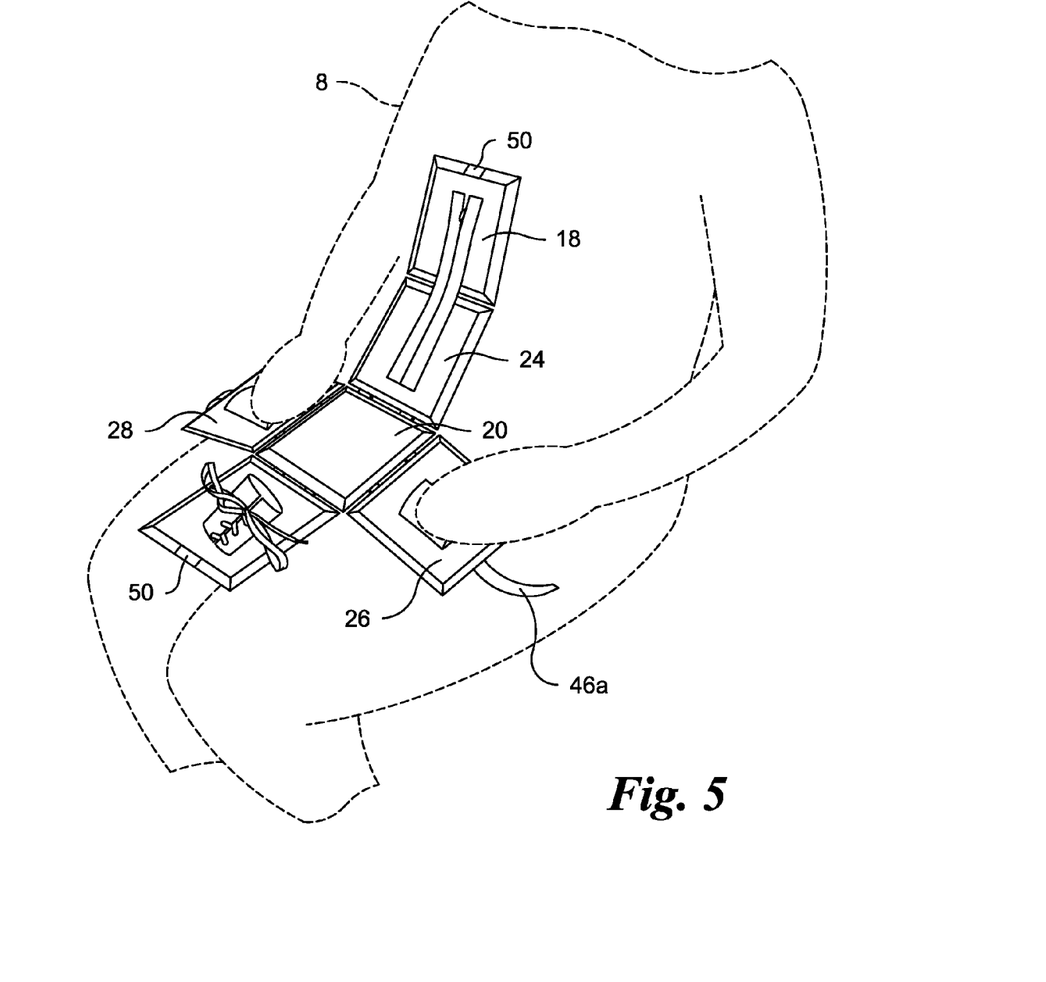

An apparatus for teaching personal life skills in accordance with a preferred embodiment of the invention is shown in FIGS. 1-5. In this embodiment, the apparatus, designated generally by reference numeral 10, comprises a configurable platform 12 and a plurality of training tools 14 fixed to and stored within the platform 12. In one configuration shown in FIG. 1 (closed configuration), the platform 12 forms a housing in which the training tools 14 are concealed and stored. In another configuration shown in FIG. 3 (fully-opened configuration), the walls of the platform 12 lie flat and are coplanar, thereby exposing the training tools 14. The walls of the platform 12 can be arranged in many other configurations such as shown in FIG. 5, wherein the walls lie on and conform to the contour of the student's body.

The configurable platform 12 comprises a plurality of walls that are connected by hinges 16. In the embodiment shown in FIGS. 1-5, the platform 12 has six, similarly-sized walls. However, it should be appreciated that the platform may have a different shape, and may be comprised of a different number of walls that may or may not be similarly sized. With reference to the configuration shown in FIG. 1, the platform 12 includes a top wall 18, bottom wall 20, front wall 22, back wall 24, left side wall 26 and right side wall 28. The terms top, bottom, front, back, left and right describe the position of the walls relative to the student when the platform 12 is configured as a cubic housing and is oriented in its primary orientation at rest on the student's lap or body as best seen in FIG. 4.

The walls may be made from any rigid material such as plastic, metal or wood. Each wall has an interior surface 18a-24a, an exterior surface 18b-24b, and tapered edges 18c-24c. The edges 18c-24c taper at approximately 45 degrees so that abutting edges orient adjacent walls 90 degrees relative to one another. The walls should be large enough to support a life-skills training tool 14 and provide a steady base for working with the tool 14. However, the walls should not be so large that the platform becomes cumbersome for a student to lift or handle. In the embodiment shown in FIGS. 1-5, the walls are approximately 6 in.×6 in. and about ½ in. thick.

Each wall 16-24 is pivotally connected to at least one other wall by a pair of hinges 16. In this preferred embodiment, the hinges 16 are generally-equally spaced along the edge of the walls and have decorative leaves. However, it should be appreciated that the walls could be pivotally connected with other types of hinge including an elongate piano hinge or a flexible fabric. Furthermore, while the hinges 16 shown in FIGS. 1-5 allow pivotal movement around only one axis, the walls could be connected with other types of hinges that enable pivotal movement around two or more axes.

In the preferred embodiment shown in FIGS. 1-5, a plurality of life-skills training tools are attached to the inner surface of several of the walls. In this preferred embodiment, the training tools simulate common fasteners found on articles of clothing. For example, the tool 30 on the front wall 22 of the housing simulates the act of tying one's shoelaces. The tools 32, 34 fixed to the left 26 and right 28 walls, respectively, simulate the act of buttoning the left and right sleeves of a dress shirt, respectively. The tool 36 fixed to the back 24 and top 18 walls of the housing simulates the act of opening and closing the zipper on, for example, a jacket. Other tools could simulate the act of tying a necktie, or manipulating clothing snaps and hooks.

In the preferred embodiments, the size and construction of the training tools are life-size scale and accurately replicate the skill encountered in real life. Most training tools can be mounted on a single platform wall; however, some tools, such as the zipper tool 36, are larger than a single platform wall and must be mounted to two or more walls. In such case, the tool must straddle two walls and have sufficient flexibility to allow the walls to pivot relative to one another into the aforementioned configurations.

In a preferred embodiment, the educational tools are removably fixed to the inner surface of the platform walls with removable fasteners such as Velcro tabs, snaps, pins or adhesive. As the student masters the skill associated with a particular tool, it can be removed and replaced with a different tool. As a student's education or age progresses, all of the tools can be replaced to accommodate the student's age and skill level. Because the tools are removable, the same platform can be used during the student's entire education life cycle.

In other preferred embodiments, the tools that are subjected to the most forceful manipulation may be permanently fastened to the platform 12 to avoid unintentional removal. Such tools may be, for example, glued or stapled to the interior wall surfaces.

In yet other preferred embodiments, the tools are permanently fixed to the inner surfaces of the platform walls. However, in this embodiment, the walls of the platform are removable and replaceable. The apparatus includes a plurality of replacement walls that are provided with different training tools attached thereto. In order to replace/substitute training tools on the platform, the teacher or student must disconnect the old wall from the platform by removing the screws connecting the wall to the hinges. The student must then connect the new wall. In this embodiment, the student may learn and practice the additional fine motor skill of working with a screw driver.

In the preferred embodiments, the training tools relate to personal life skills. However, it should be appreciated that the apparatus could incorporate tools that simulate a wide variety of manipulative skills from a wide variety of occupations. For example, the tools could simulate common manipulative acts involved in sewing, cooking, carpentry, etc.

In preferred embodiments, the tools replicate the size and construction of everyday objects that must be manipulated by the student. More importantly, when the apparatus 10 is used in its primary orientation, the tools are oriented with first-person perspective. In other words, the tools replicate the orientation of the objects relative to the orientation encountered by the student in real life. For example, the tool 36 that replicates opening and closing a separating zipper, has a left fabric flap 38a and a right fabric flap 38b. Both fabric flaps have a row of teeth with a top stop. The bottom retainer box and slider are positioned on the right row of teeth while the insertion pin boll is fixed to the bottom of the left row of teeth. When the apparatus rests on the student in the proper orientation shown in FIG. 5, the left and right zipper components of the tool 36 are oriented on the same side as encountered in real life. This orientation is referred to as first-person perspective. This aspect of the invention ensures that the student need not make any mental juxtaposition of a skill from the classroom to the real world.

Similarly, the tool 30 that replicates tying the laces of a shoe, has a left fabric flap 40a and a right fabric flap 40b. Both fabric flaps have a row of eyelets extending along the lengthwise edge. Starting at the distal end, a shoe lace interweaves through the eyelets up to the proximal end. When the apparatus rests on the student's lap in the proper orientation shown in FIG. 5, the tool 30 orients the free (untied) end of the lace at the proximal end of the eyelets in the same manner as encountered in real life.

Figure 1:
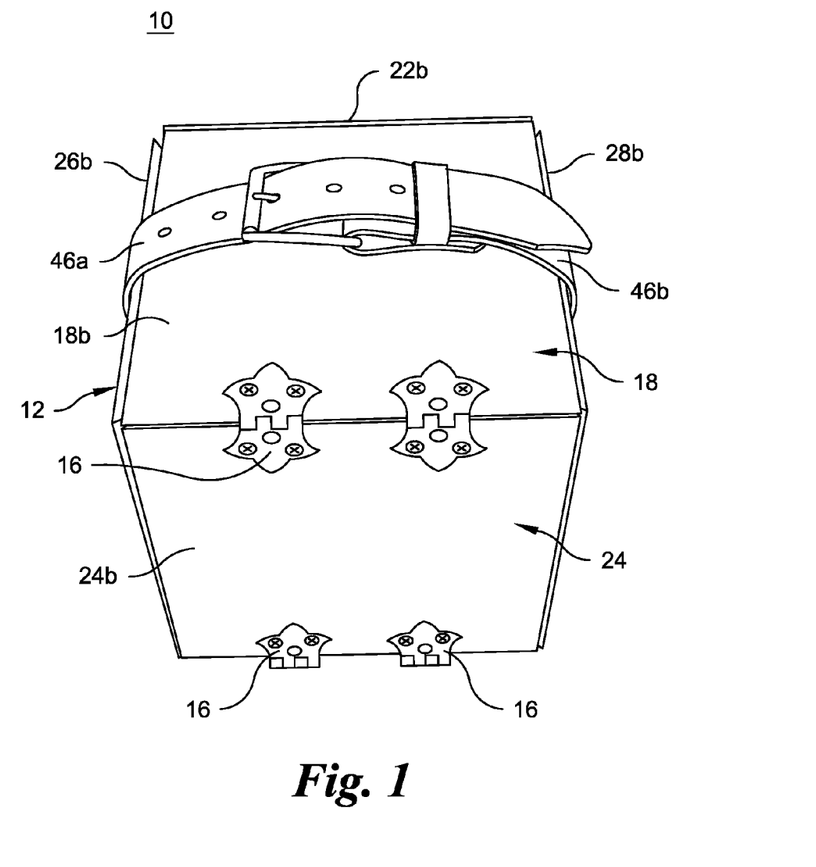
FIG. 1 is a perspective view of an apparatus for teaching personal life skills in accordance with a preferred embodiment of the invention wherein the platform is closed.
Figure 2:
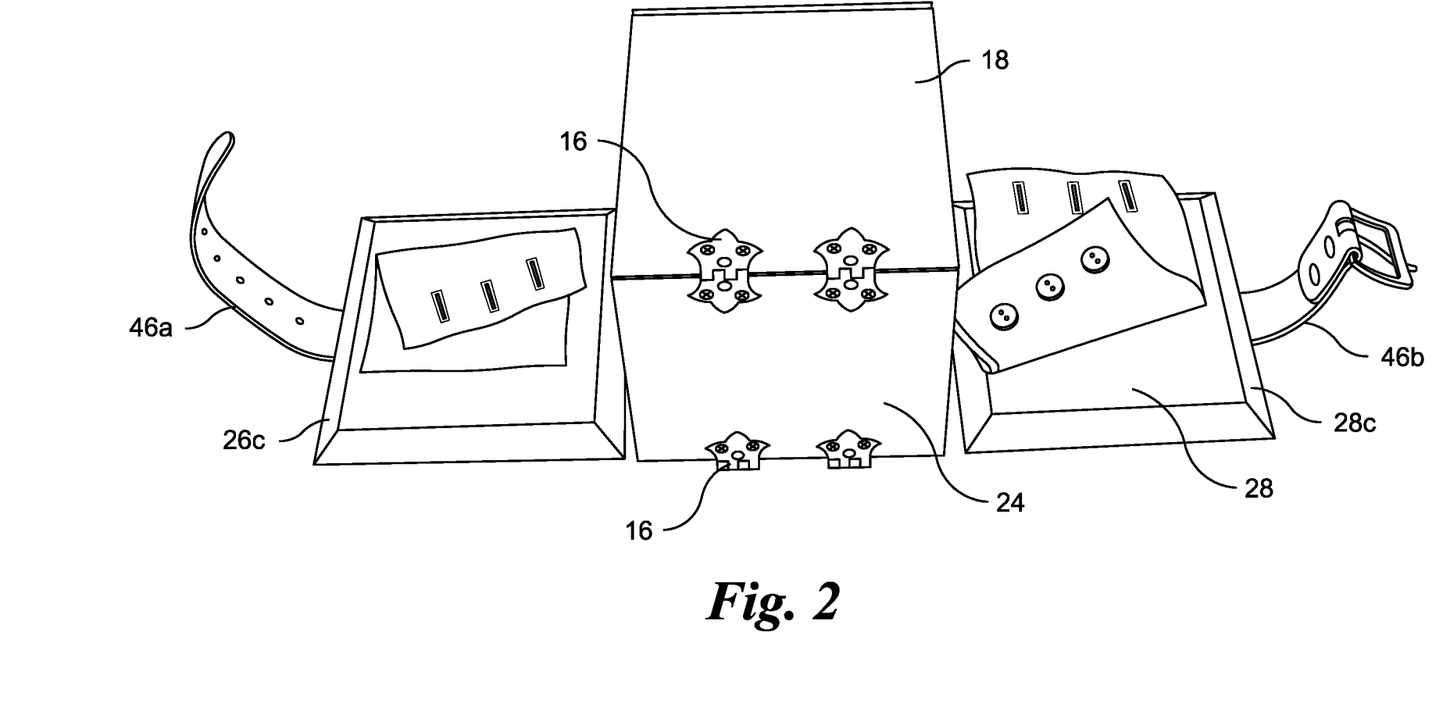
FIG. 2 is a perspective view of the apparatus of claim 1 wherein the platform has been partially reconfigured to a partially-open configuration.

In the first configuration shown in FIGS. 1 and 4, the platform 12 encloses and protects the training tools. In this configuration, the apparatus can also be more easily and compactly stored. The apparatus 10 includes locking means to hold the platform 12 in the closed configuration. In the embodiment shown in FIGS. 1-5, the locking means comprises a life-skills training tool 44 that simulates fastening and unfastening a fashion belt. The tool 44 comprises a leather strap 46a affixed to the outer surface 26a of the left wall 26, and a second leather strap 46b affixed to the outer surface 28a of the right wall 28. The first strap 46a has a plurality of eyelets while the right strap 46b has a belt buckle connected to the end. When the apparatus rests on the lap of a student in the primary orientation shown in FIG. 4 with the back wall 24 abutting the student's torso, the tool 44 orients the free end 46a and buckle end 46b of the simulated belt in the same manner as encountered in real life. When the straps 46a and 46b are buckled together, the straps hold the left 26 and right 28 walls in tight contact with the top 18, bottom 20, front 22 and back 24 walls in the configuration shown in FIG. 1.

In a preferred embodiment, the locking means may also include Velcro tabs 50 connecting the edges of abutting side walls. As best seen in FIGS. 3 and 5, Velcro tabs are affixed to an edge of the front wall 22 and the top wall 18. In this embodiment, the tabs 50 help secure the front wall 22 in the closed configuration.

In preferred embodiments, the platform 14 also functions as a training tool. For example, the platform 14 is designed to open and close using a specific sequence of steps. Furthermore, the platform 14 must initially be oriented correctly relative to the student's body in order to correctly use the training tools. Therefore, the student must initially learn how properly orient, open, use and close the apparatus 10. These operative steps, in and of themselves, are training tools for the student.

In preferred embodiments, the apparatus is stored in the closed configuration shown in FIG. 1. To use the apparatus, the student initially sets the apparatus in his or her lap in the primary orientation such as seen in FIG. 4. The student should orient the apparatus so that the top side of the platform containing the locking means faces upwardly. The student then unlocks the platform by unbuckling the belt and allowing the side walls to pivot open in the configuration shown in FIG. 5. The student then interacts with each of the training tools as the student sees fit. When training is complete, the student reconfigures the platform 14 into the closed configuration and locks the platform 14 by buckling the belt.

While the principles of the invention have been described above in connection with specific embodiments, it is to be clearly understood that this description is made only by way of example and not as a limitation on the scope of the invention. For example, the student could use the apparatus without first orienting the apparatus in the primary orientation; however, in this orientation, the student would not gain the benefit of learning the skill from a first-person perspective.

The invention claimed is:

1. An apparatus for teaching fine motor skills to a special needs student, comprising:
   a configurable platform comprising a plurality of walls, each wall having an interior surface and an exterior surface;
   a plurality of hinges pivotally connecting each wall with at least one other wall; and,
   at least one skills training tool fixed to the interior surface of at least one wall;
   wherein the walls of the platform can be oriented and arranged in at least a first configuration forming a housing enclosing the educational tool, and a second configuration wherein all of the walls are coplanar; and
   wherein said apparatus has a primary orientation in which the education effects are optimized and the at least one tool replicates the orientation of objects encountered by the student in real life when the apparatus is arranged in its primary orientation and rests against the student's body.

2. The apparatus recited in claim 1, wherein said platform comprises six equally-sized walls that form an enclosed cube in the first configuration.

3. The apparatus recited in claim 1, wherein said walls can be oriented and arranged in at least a third configuration wherein none of the walls are coplanar.

4. The apparatus recited in claim 1, including means for locking the walls in the first configuration.

5. The apparatus recited in claim 4, wherein said locking means comprises a skills training tool fixed to the exterior surface of at least one of said walls.

6. The apparatus recited in claim 5, wherein said skills training tool comprises a clothing belt.

7. The apparatus recited in claim 1, wherein said skills training tool comprises a clothing fastener selected from the group consisting of zippers, belts, shoelaces, buttons, snap fasteners, hooks, and Velcro tabs.

8. The apparatus recited in claim 1, wherein said objects are objects of apparel.

9. The apparatus recited in claim 8, wherein said skills training tool is first-person oriented when said apparatus is arranged in the primary orientation and rests against the student's torso.

10. The apparatus recited in claim 1, including a plurality of interchangeable skills training tools fixed to multiple platform walls.

11. The apparatus recited in claim 1, wherein the walls must be folded in a defined sequence in order to form the housing.

12. The apparatus recited in claim 1, wherein said walls are removably and pivotally connected to one another.

13. The apparatus recited in claim 12, including a plurality of replacement walls having a skills training tool attached thereto.

14. The apparatus recited in claim 10, wherein said skills training tools are removably fixed to said platform walls.

15. The apparatus of claim 1 wherein the tool(s) are the same size and construction of everyday objects.

16. An apparatus for teaching personal, life skills to a special needs student, comprising:
- a configurable platform comprising a plurality of walls pivotally connected to one another, each wall having an interior surface and an exterior surface; and,
- a plurality of life-skills training tools fixed to the interior surface of the walls;
- wherein the walls of the platform can be oriented and arranged in at least a first configuration forming a housing enclosing the educational tool, a second configuration exposing said training tool for use by the student, and a third configuration wherein none of the walls are coplanar; and
- wherein the tools replicate apparel objects encountered by the student in real life when the apparatus is in the third configuration and rests against the student's torso.

17. The apparatus recited in claim 16, wherein said life-skills training tools are first-person oriented when said apparatus is arranged in the primary orientation and rests against the student's body.

18. An apparatus for teaching personal, life skills to a special needs student, comprising:
- a configurable platform comprising a primary orientation and a plurality of walls pivotally connected to one another, each wall having an interior surface and an exterior surface; and,
- a plurality of skills training tools fixed to the interior surface of the walls, said training tools replicating personal apparel objects in both size and shape;
- wherein the training tools replicate the orientation of the apparel objects encountered by the student in real life when the apparatus is arranged in its primary orientation and rests against the student's body.

19. The apparatus recited in claim 18, wherein the walls of the platform can be oriented and arranged in at least a first configuration forming a housing enclosing the educational tool, and a second configuration exposing said training tool for use by the student.

* * * * *